(No Model.)

G. HUNTER.
WINDING MECHANISM FOR MAINSPRING BARRELS.

No. 596,407. Patented Dec. 28, 1897.

Witnesses
Frank P. Prindle.
Henry C. Hazard.

Inventor
George Hunter, by
Prindle and Russell, his Att'ys

THE NORRIS PETERS CO., PHOTO-LITH., WASHINGTON, D. C.

UNITED STATES PATENT OFFICE.

GEORGE HUNTER, OF ELGIN, ILLINOIS, ASSIGNOR TO THE ELGIN NATIONAL WATCH COMPANY, OF CHICAGO, ILLINOIS.

WINDING MECHANISM FOR MAINSPRING-BARRELS.

SPECIFICATION forming part of Letters Patent No. 596,407, dated December 28, 1897.

Application filed January 14, 1897. Serial No. 619,239. (No model.)

*To all whom it may concern:*

Be it known that I, GEORGE HUNTER, of Elgin, in the county of Kane, and in the State of Illinois, have invented certain new and useful Improvements in Winding Mechanism for Mainspring-Barrels; and I do hereby declare that the following is a full, clear, and exact description thereof, reference being had to the accompanying drawings, in which—

Figure 1:
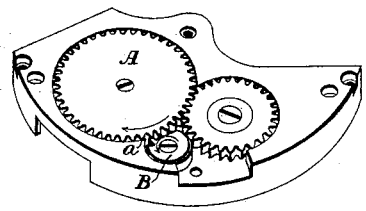
Figure 2:
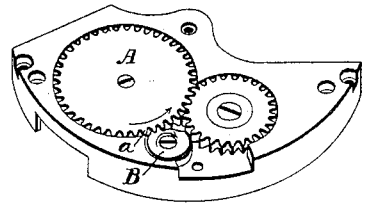
Figure 5:
Figure 3:
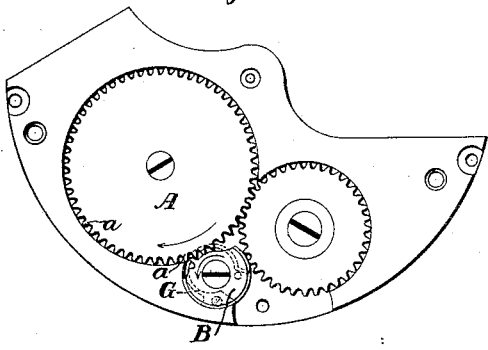
Figure 4:
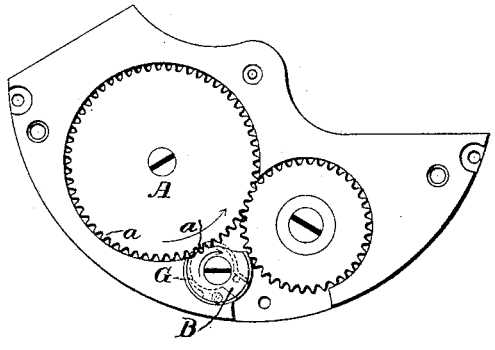

Figures 1 and 2 are perspective views of the winding-wheels and click upon the rear plate of a watch-movement and show, respectively, the relative positions of the parts when winding pressure is exerted and when such pressure has been released. Figs. 3 and 4 are respectively enlarged plan views of the winding-wheels and click. Fig. 5 is a like view of said click, showing a modification in construction; and Fig. 6 is a plan view of the same provided with several engaging teeth.

Letters of like name and kind refer to like parts in each of the figures.

The object of my invention is to prevent the effect produced by the overwinding of the mainspring of a watch; and to such end said invention consists in means whereby when pressure is released upon the winding-arbor there will be a release and recoil of the mainspring, substantially as and for the purpose hereinafter specified.

Figure 6:

In the carrying of my invention into practice I employ, in connection with the usual winding-wheel A of a watch, a pawl or click B, which has the general form of a disk and is provided with a peripheral tooth $b$, or, if preferred, with several teeth, as shown in Fig. 6. In front of the tooth $b$ the periphery of the pawl is upon a line with the top of said tooth, while for a distance in rear of the latter the periphery of said disk is upon a line with the bottom of such tooth, so as to clear the tops of the teeth $a$ and $a$ of the wheel A. A spring G (shown by dotted lines in Figs. 3 and 4) operates to hold said pawl or click with a yielding pressure in the direction shown by the arrows in Figs. 3 and 4.

The click B is pivoted in such position as to cause its tooth $b$, when permitted, to mesh fairly with the teeth $a$ and $a$ of the winding-wheel A, and when the latter is rotated in the direction necessary to wind the mainspring, as shown by the arrows in Figs. 1 and 2, said click will be turned rearward against the pressure of its spring C and its said tooth $b$ will trip over said teeth $a$ and $a$; but when the winding pressure is removed from said wheel A it will be turned forward in the direction indicated by the arrows of Figs. 2 and 4, and said tooth $b$ will then engage and move in the same direction as said teeth $a$ and $a$ until the higher portion $b'$ of said click immediately in rear of said tooth $b$ engages with the ends of the contiguous teeth $a$ and $a$ and by cam action locks said winding-wheel from farther backward motion.

The backward motion or recoil of the winding-wheel A slightly uncoils the mainspring and loosens its coils, so as to release them from the friction which is caused by close winding, thereby preventing derangement of the time of the watch or its stoppage from that cause. As the amount of recoil is dependent upon the distance between the tooth $b$ and the cam-surface $b'$ of the click B, it will be seen that any desired amount of recoil may be secured by adding to the number of teeth upon the latter.

In Figs. 1 to 4, both inclusive, the click B is shown with its general diameter larger than is necessary, for, as seen in Fig. 5, its diameter need be no greater than sufficient to provide for an engaging tooth and cam-surface and at other points may be cut away, if desired.

Having thus described my invention, what I claim is—

As an improvement in winding mechanism, the combination of a toothed, spring-winding wheel, a spring-pressed, pivoted recoiling click, having one or more teeth to coöperate with the teeth of said wheel, the number of the click-teeth serving to determine the amount of recoil of the spring, said click having adjacent to one side of its tooth or teeth, an untoothed surface that, in a radial direction, is farther from the click-pivot than is the bottom of the tooth or teeth, which surface impinges on the ends of the teeth of the spring-winding wheel to lock said wheel from rotation in one direction, and having adjacent to the other side of the tooth or teeth an untoothed surface that does not extend beyond the bottom of the tooth or teeth, whereby the winding-wheel is free to rotate in an opposite direction, substantially as and for the purpose specified.

In testimony that I claim the foregoing I have hereunto set my hand this 6th day of January, 1897.

GEORGE HUNTER.

Witnesses:
   GEORGE E. HUNTER,
   W. H. CLOUDMAN.